C. L. TOLLES.
TRACTION BELT.
APPLICATION FILED NOV. 1, 1912.
1,146,537.
Patented July 13, 1915.
3 SHEETS—SHEET 3.
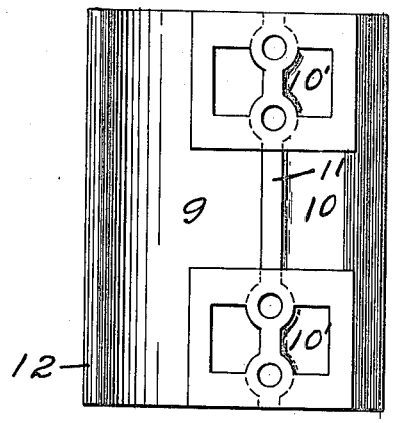
FIG. 5.
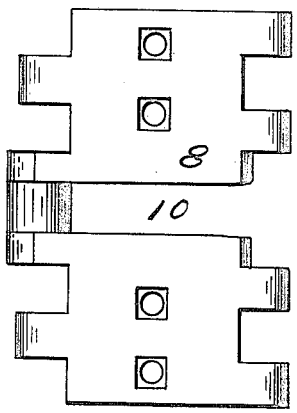
FIG. 6.
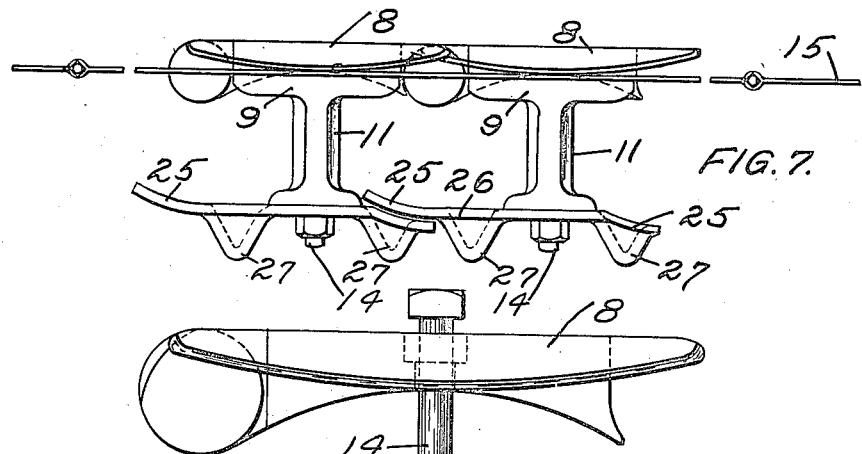
FIG. 7.
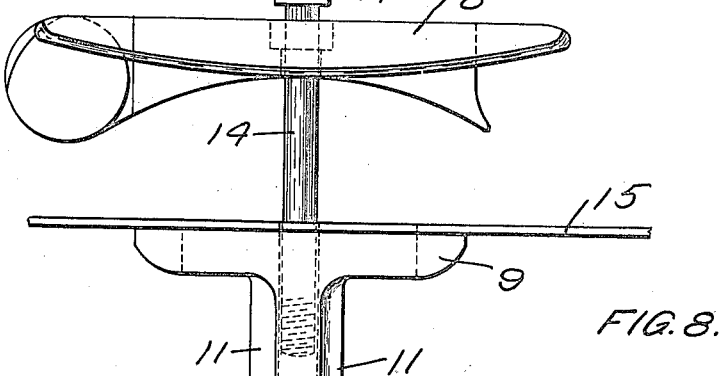
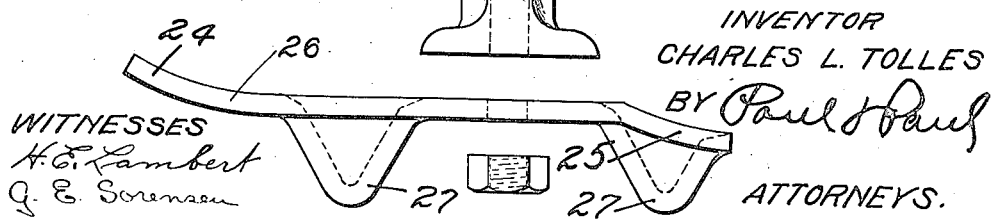
FIG. 8.
INVENTOR
CHARLES L. TOLLES
BY Paul & Paul
ATTORNEYS.
WITNESSES
H. E. Lambert
G. E. Sorensen

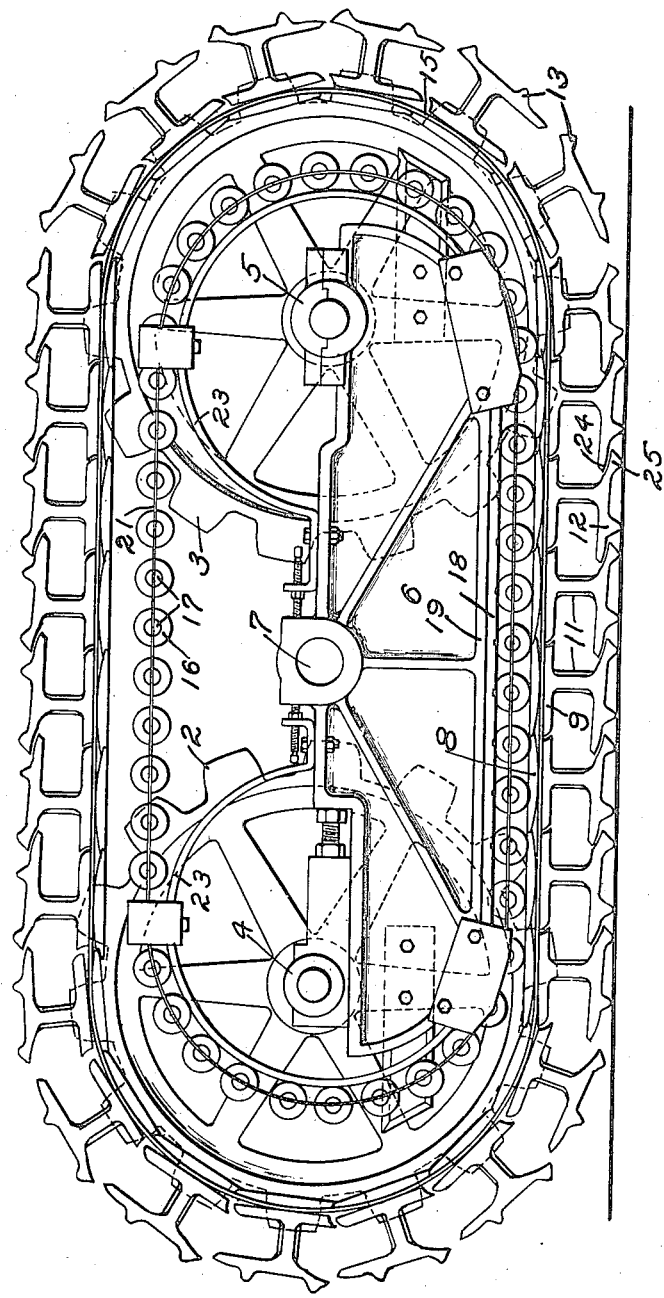

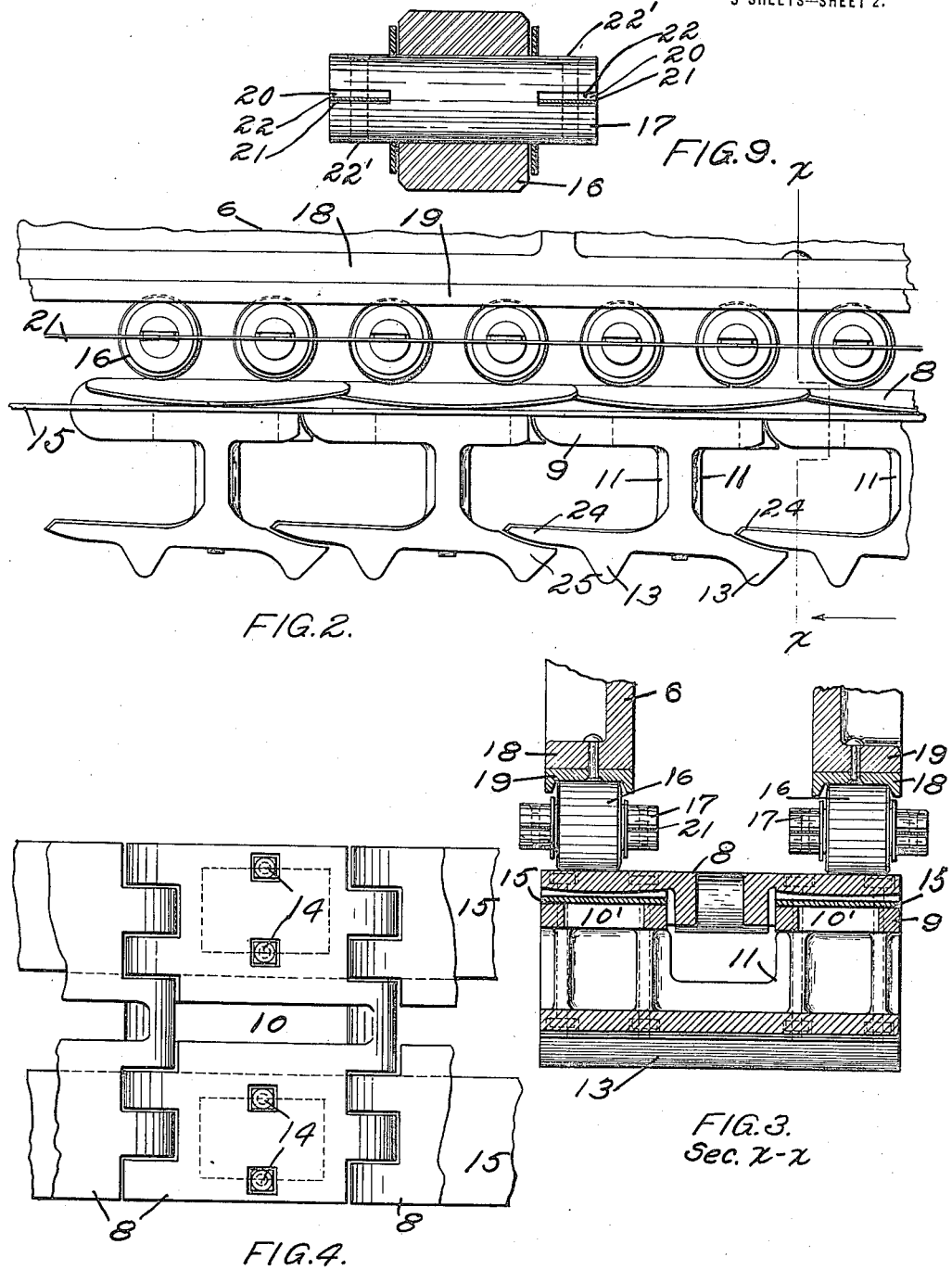
C. L. TOLLES.
TRACTION BELT.
APPLICATION FILED NOV. 1, 1912.
1,146,537.
Patented July 13, 1915.
3 SHEETS—SHEET 2.
WITNESSES
H. E. Lambert
G. E. Sorensen
INVENTOR
CHARLES L. TOLLES.
BY Paul & Paul
ATTORNEYS.

UNITED STATES PATENT OFFICE.

CHARLES L. TOLLES, OF EAU CLAIRE, WISCONSIN.

TRACTION-BELT.

1,146,537.  Specification of Letters Patent.  Patented July 13, 1915.

Application filed November 1, 1912. Serial No. 729,115.

*To all whom it may concern:*

Be it known that I, CHARLES L. TOLLES, of Eau Claire, Eau Claire county, Wisconsin, have invented certain new and useful Improvements in Traction-Belts, of which the following is a specification.

My invention relates to traction belts similar to the one shown and described in my pending application filed May 14, 1912, Serial No. 697,265.

The primary object of my invention is to provide a flexible traction belt and one in which, as in my former application, no rivets will be used between the links.

A further object is to provide a construction which will be very durable and in which there will be less danger of clogging or breaking the traction shoes by the accumulation of sticks, stones, or refuse matter between them.

Other objects of the invention will appear from the following detailed description.

The invention consists generally in various constructions and combinations, all as hereinafter described and particularly pointed out in the claims.

In the accompanying drawings forming part of this specification, Figure 1 is a side elevation of a traction belt embodying my invention, Fig. 2 is a detail view of a portion of the belt, Fig. 3 is a sectional view on the line $x$—$x$ of Fig. 2, Fig. 4 is a plan view of a section of the belt, Fig. 5 is a detail plan view of the lower plate of a link, Fig. 6 is a similar view of the upper plate, Fig. 7 is a detail view, showing a modified construction of the traction shoe, Fig. 8 is a detail view, showing the plates of the link and the shoe assembled, preparatory to securing them together, Fig. 9 is a detail view, showing the manner of mounting the anti-friction rolls.

In the drawing, 2 and 3 represent sprocket wheels journaled in boxes 4 and 5 in the frame 6.

7 is a drive shaft, on which the frame and sprocket wheels are adapted to oscillate and allow the sprocket belt to conform to the inequalities of the ground over which the machine may be moving.

As in my pending application above referred to, I have omitted the driving connection between the sprocket wheels and the drive shaft, as it forms no part of my present invention.

The traction belt proper consists of a series of links, each comprising an inner plate 8 and an outer plate 9. Slots or recesses 10 are formed in the inner and outer plates to receive the teeth of the sprocket wheels 2 and 3. These inner and outer plates together constitute the links of the sprocket belt and each outer plate has a transverse web 11, preferably formed integrally thereon, projecting outwardly at right angles substantially to the plane of the plates and terminating in a shoe 12 which lies in a plane parallel substantially with the plane of the plates 8 and 9 and preferably provided on its under surface with traction spurs or teeth 13. Instead of using four short bolts securing the plates 8 and 9 on each side together, as in my application above referred to, I prefer to provide two long bolts 14 on each side of the slot 10, said bolts having heads countersunk into the plates 8 and passing down through the plates 9 and the webs 11 and provided at their lower ends with lock nuts which, when tightened, will clamp the upper and lower plates securely together. Between the plates 8 and 9 I provide flat bands or belts 15, preferably of steel, and I prefer to make the under surfaces of the plates 8 convex both longitudinally and transversely of the plates, so that there will be a center bearing for the inner plates on the belts and any foreign material, such as sand or gravel, will work out from between the plates in the operation of the belt. Furthermore, the steel bands being secured only at the centers on the plates, will have a greater freedom of movement and will conform more readily to the sprocket wheel and any obstruction over which the belt may be passing. A flat band of this kind will also be more flexible than the cables of my pending application and I may prefer to use the flat band construction in place of the cables. The webs and shoes will preferably be made of manganese steel, as specified in my pending case, owing to its strength and durability when subjected to the rough usage of a logging engine or in field work.

The outer plates are preferably provided with holes or openings 10′ through which any sand or foreign material entering between the plates may fall. This construction will allow the links to clear themselves and prevent undue wear on their bearing surfaces.

Between the lower run of the traction belt and the frame 6 I provide anti-friction bearings consisting, preferably, of rolls 16 mounted on studs 17 and adapted to bear on the upper surfaces of the plates 8 and on the under surfaces of channel bars 18 secured to flanges 19 at the lower edge of the frame 6. The ends of the studs 17 are provided with recesses or slots 20. Bands 21, preferably of steel, are fitted within these slots and secured by filler plates 22 and rivets 22'. The slots are made, for convenience in manufacture, of greater depth than would be necessary for the bands, the excess space being closed by the filler plates. These bands are continuous and being more flexible than the cables of my pending application, I may prefer to use them in place of the cables.

I prefer also to provide the hubs 23 shown in my former application, forming continuations of the channel bars 18 and bearings for the anti-friction rollers.

The traction shoes 12 preferably have ends 24 adapted to overlap the ends 25 of the adjoining shoe. This is for the purpose of preventing sand and sticks or stones from wedging in between the ends of the adjoining shoes. As in my former application, the webs are of sufficient length to raise the bands and their clamping plates a considerable distance above the traction shoes, thereby adapting the belt for use in snow, sand or mud without, under ordinary conditions, allowing the plates or bands to become embedded therein. The bands may be made of suitable thickness and width to obtain the desired strength and durability, and other means may be employed for securing the clamping plates together and I do not, therefore, wish to be confined to the details of construction as herein shown.

In Figs. 7 and 8 I have illustrated a modified construction, which consists in forming a shoe 26 of drop forging, preferably independently of the web to which it is secured. The spurs or projections are formed by punching down triangular sections 27 of the forging. This construction will allow the convenient removal or replacing of any one of the shoes without disturbing the section of the link to which it is secured. The bolts in this construction pass down through the upper and lower plates and webs and have threaded lower ends and lock nuts corresponding to those shown in the other construction.

A traction belt of this type will be flexible and very strong. There are no pivots between the links to wear or grind out and the belt is therefore adapted for use in the field or on sand or gravel roads without material wear, and generally the bands and the plates between which they are secured will be raised a sufficient distance from the ground by the webs and shoes to prevent the bands and the wearing surfaces of the links from normally coming in contact with the soil. Generally in belts of this character pivot pins are employed between adjoining links and these pins soon wear out, particularly where the belt is allowed to rest directly upon the ground. By using these endless bands I have entirely avoided this objection and I have also found that the bands will be flexbile to such a degree that the belt will readily conform to the periphery of the sprocket wheel.

For convenience in removing the belt I prefer to make the endless band in sections, as indicated in the detail views, so that by simply removing the pivot pins one or more sections of the traction belt can be detached and removed from the machine. Any suitable number of sections may be employed, but generally two or three will be sufficient to allow convenient removal of the belt.

I claim as my invention:—

1. A traction belt comprising a series of links, each composed of an inner and an outer member, an endless flexible connecting element passing between said members, one of said members having a surface convex from end to end thereof opposing the other member, and means for securing said members of each link together and to said flexible element, said outer member having a traction means thereon.

2. A traction belt comprising a series of links, each composed of an inner and an outer member, an endless flexible element passing between said members, the inner face of the inner member being convexed both transversely and longitudinally, and means for securing said members of each link together and to said flexible element, said outer member having a traction means thereon.

3. A traction belt comprising a series of links, each composed of an inner and an outer member, an endless flexible connecting element passing between said members, one of said members having a surface convex from end to end thereof opposing the other member, means for securing said members of each link together and to said flexible element, a transverse web extending outwardly from said outer member, a shoe carried by the outer end of said web and disposed parallel with said outer member, and a traction means on the outer face of said shoe.

4. In a traction belt, a link composed of inner and outer members adapted to be clamped against opposite sides of an endless belt, the inner face of one of said members being convex from end to end thereof, and a traction element carried by said outer member.

5. In a traction belt, a link composed of inner and outer members adapted to be clamped against opposite sides of an endless belt, the inner face of one of said members being convex both transversely and longitudinally, and a traction element carried by said outer member.

6. In a traction belt, a link composed of inner and outer members adapted to be clamped against opposite sides of an endless belt, the inner face of one of said members being convex from end to end thereof, a transverse web extending outwardly from the said outer member, and a traction shoe carried by the outer end of said web and disposed parallel with said outer member.

7. In a traction belt, a series of links, each link composed of an inner and an outer member, an endless flexible connecting element passing between said members, the face of one of said members adjacent the flexible connecting element being convex from end to end thereof, means for securing said members of each link together and to said flexible element at the center of the said members, a transverse web extending outwardly from the outer member, and a shoe carried by the outer end of said web and arranged parallel with said outer member, the adjacent ends of adjacent shoes being normally disposed in overlapping relation.

8. A traction belt comprising a series of traction sections provided with flared recesses, wearing shoes secured thereto, and a flexible strip located in said recesses and clamped between the shoes and the traction sections.

In witness whereof, I have hereunto set my hand this 22nd day of October, 1912.

CHARLES L. TOLLES.

Witnesses:
F. C. BARLOW,
T. B. ROLAND.